(12) United States Patent
Nematollahi

(10) Patent No.: US 9,916,700 B2
(45) Date of Patent: Mar. 13, 2018

(54) ASSET-AGNOSTIC FRAMEWORK WITH ASSET-SPECIFIC MODULE FOR ALTERNATE BUS PARAMETER CALCULATION

(71) Applicant: Webtech Wireless Inc., Burnaby (CA)

(72) Inventor: Alireza Nematollahi, Vancouver (CA)

(*) Notice: Subject to any disclaimer, the term of this patent is extended or adjusted under 35 U.S.C. 154(b) by 51 days.

(21) Appl. No.: 14/828,082

(22) Filed: Aug. 17, 2015

(65) Prior Publication Data
US 2017/0053462 A1 Feb. 23, 2017

(51) Int. Cl.
*G07C 5/08* (2006.01)
*G07C 5/00* (2006.01)
*B60W 10/00* (2006.01)

(52) U.S. Cl.
CPC ............. *G07C 5/08* (2013.01); *B60W 10/00* (2013.01); *G07C 5/008* (2013.01)

(58) Field of Classification Search
CPC ........ G07C 5/0841; G07C 5/08; G07C 5/008; G07C 5/004; G07C 5/0816
USPC .................... 701/123, 29.3, 31.4, 32.7, 34.2
See application file for complete search history.

(56) References Cited

U.S. PATENT DOCUMENTS

| | | | | |
|---|---|---|---|---|
| 6,718,425 B1* | 4/2004 | Pajakowski | ........... | G01M 17/00 710/303 |
| 7,714,705 B2* | 5/2010 | Rennie | ................... | G08G 1/017 340/426.16 |
| 8,751,098 B2 | 6/2014 | Faus et al. | | |
| 8,838,332 B2 | 9/2014 | Moinzadeh et al. | | |
| 2004/0138790 A1* | 7/2004 | Kapolka | ................ | G07C 5/008 701/29.3 |
| 2005/0060070 A1* | 3/2005 | Kapolka | ................ | G07C 5/008 701/31.4 |
| 2005/0065678 A1* | 3/2005 | Smith | .................... | G07C 5/008 701/31.4 |
| 2005/0203673 A1* | 9/2005 | El-Hajj | ................. | G07C 5/008 701/1 |
| 2008/0140278 A1 | 6/2008 | Breed | | |
| 2009/0248237 A1 | 10/2009 | Koepf et al. | | |
| 2010/0228404 A1 | 9/2010 | Link, II et al. | | |
| 2013/0338855 A1 | 12/2013 | Mason et al. | | |

(Continued)

OTHER PUBLICATIONS

Ryu, Hyun-Ki, et al. "The design of remote vehicle management system based on OMA DM protocol and AUTOSAR S/W architecture." Advanced Language Processing and Web Information Technology, 2008. ALPIT'08. International Conference on. IEEE, 2008.

*Primary Examiner* — Bao Long T Nguyen

(57) ABSTRACT

Network buses in vehicles and other assets are monitored in order to obtain information and calculate alternate values of parameters relating to components connected to the bus and to send them to a management server. The device includes main code, which is common to the different vehicles or assets in a group, and a script, which is specific to each type of vehicle or asset. The script, which may be customizable, is responsible for defining the parameters to obtain and for defining how the values of the parameters are to be calculated. The script compensates for differences in the way different buses and components operate in different assets, which means that the values of like parameters obtained from different sources are all in conformance with each other. The script can be updated without interrupting the operation of the main code and the monitoring of the bus.

12 Claims, 2 Drawing Sheets

(56) References Cited

U.S. PATENT DOCUMENTS

| | | | |
|---|---|---|---|
| 2014/0100737 A1* | 4/2014 | Haap | G06F 11/2294 |
| | | | 701/31.4 |
| 2014/0351803 A1 | 11/2014 | Hoffman et al. | |
| 2015/0204758 A1* | 7/2015 | Schnell | G06Q 10/0833 |
| | | | 73/114.13 |
| 2016/0121894 A1* | 5/2016 | Seo | B60K 35/00 |
| | | | 701/36 |
| 2016/0330284 A1* | 11/2016 | Holck | H04L 67/12 |

* cited by examiner

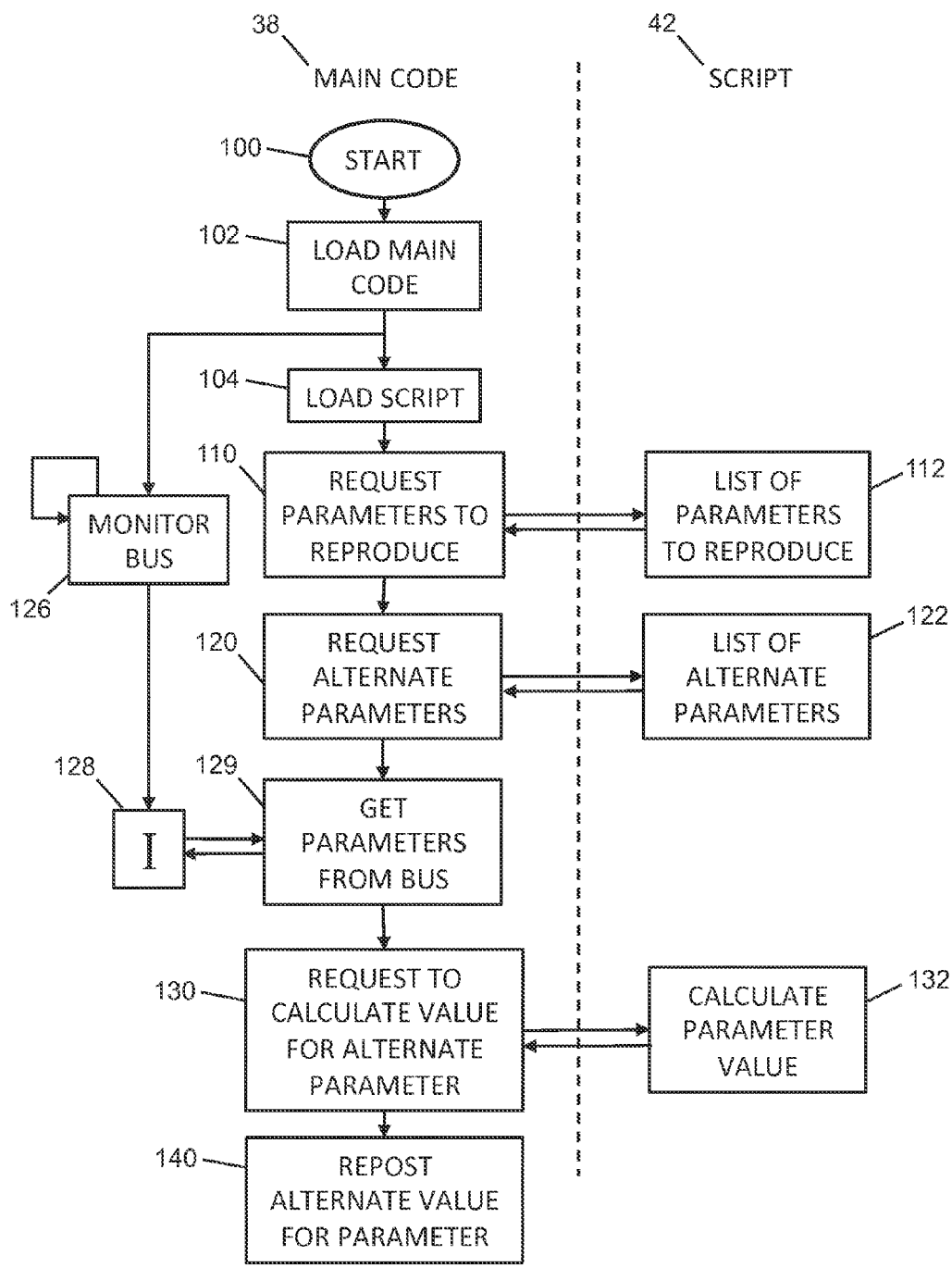

ASSET-AGNOSTIC FRAMEWORK WITH ASSET-SPECIFIC MODULE FOR ALTERNATE BUS PARAMETER CALCULATION

FIELD OF THE INVENTION

This invention relates to the field of remote asset monitoring. In particular, it relates to automatically calculating alternate values of parameters to override those that are generated on the bus of a vehicle, or to calculate values of parameters that are not directly present on the bus.

BACKGROUND OF THE INVENTION

Since the advent of wireless networks and GPS (Global Positioning System) satellites, specialized wireless devices have been installed in vehicles to facilitate fleet operations management. Such devices have also been installed in virtually anything that moves or is moved to enable asset tracking. These monitoring devices may interface with many kinds of other vehicular-based devices and systems to collect information and/or data and to transmit this to a remote server and/or fleet manager. When used by fleet operators, the monitoring devices provide a wealth of useful information such as driver behaviour, compliance with traffic rules, compliance with government regulations, and detailed time tracking.

To enhance use of vehicle buses in a vehicle electronic network, standards have been developed that describe mainly the data link layer and some aspects of the physical layer. Other protocol layers are left to a network designer's choice. Each vehicle manufacturer may be provided with parameter group numbers for their own proprietary use. As such, a vehicle bus standard may define a large number of parameters that may or may not be available on a bus installed on a particular vehicle. Vehicle manufacturers and equipment manufacturers for vehicles decide which parameters to support. Vehicle manufacturers and equipment manufacturers for vehicles may also add unique proprietary parameters. Internal calculations based on sensed values of parameters may be different from manufacturer to manufacturer, and there are no specific standards to which these calculations must adhere. As a result, this introduces limitations for vehicle owners and asset managers seeking to consistently monitor a number of vehicles of different models and/or makes that may have varying operation and performance criteria. Proprietary standards may therefore affect the usefulness of a remote asset monitoring system.

U.S. Pat. No. 8,751,098 to Faus discloses a method of monitoring CANbus (Controller Area Network bus) information. Original parameters associated with sensors are converted into virtual sensors to provide selective vehicle information to an equipment management system. A terminal may then apply logic to the virtual sensor by performing calculations indicating a comparison against a threshold, validations, and alert generations, for example.

U.S. Patent Application Publication No. 2008/0140278 to Breed discloses providing a vehicle with software to enable it to operate and interact with components thereof. Updating the vehicle software occurs via a wireless transmission from one or more remote locations, e.g., a location maintained by a dealer or manufacturer of the vehicle. The software may be diagnostic software for a diagnostic module, which diagnoses the operability of components of the vehicle.

SUMMARY OF THE INVENTION

A parameter calculation unit connected to a vehicle bus has a main code that is common to different vehicles and a script that is specific to each different vehicle. The script can be updated independently of the main code.

Disclosed herein is a device for obtaining a value of a parameter from information present on a network bus of an asset, the device comprising: a processor operably connected to a network bus of the asset; a computer readable memory operably connected to the processor; a main code stored in the memory, the main code being asset agnostic; and a script stored in the memory, the script being asset specific. The processor, upon execution of the main code, requests a parameter to obtain; upon execution of the script, receives the parameter to obtain; and also upon execution of the script, obtains a value of the parameter from information present on the network bus. The processor, upon execution of the script, can receive an algorithm for calculating the value of the parameter and can obtain the value of the parameter by performing the algorithm on the information.

Also disclosed is a method for obtaining a value of a parameter from information present on a network bus of an asset, the method comprising: executing, by a processor, an asset agnostic main code and thereby requesting a parameter to obtain; executing, by the processor, an asset specific script and thereby receiving the parameter to obtain; and executing, by the processor, said script and thereby obtaining a value of the parameter from information present on the network bus. The method may further comprise: executing, by the processor, said script and thereby receiving an algorithm for calculating the value of the parameter; and obtaining the value of the parameter by the processor performing the algorithm on said information.

Still further disclosed is a system for obtaining a value of a parameter from information present on a network bus of an asset, the system comprising: a server; a processor operably connected to a network bus of the asset; a computer readable memory operably connected to the processor; a main code stored in the memory, the main code being asset agnostic; and a script stored in the memory, the script being asset specific. The processor, upon execution of the main code, requests a parameter to obtain; upon execution of the script, receives the parameter to obtain; upon execution of the script, obtains a value of the parameter from information present on the network bus; and upon execution of the main code, transmits the value of the parameter to the server over the air. It is possible that the asset is a vehicle in a group of vehicles of different make, model, year and/or specification; the main code is agnostic to all vehicles within the group; and the value of the parameter conforms, in a way in which it is calculated, with other values of like parameters received by the server from all said vehicles, such that post-processing by the server to conform it to said other values is unnecessary.

The subject matter disclosed herein allows proprietary and vehicle-specific calculations for vehicle bus parameters to be performed in the vehicle rather than by a remote management server. It allows for the definitions of the calculations and the corresponding algorithms to be sent over the air to the vehicle, without interruption of the monitoring of the vehicle bus by the main code. Results of the vehicle-specific calculations are sent from the vehicle over the air to the management server instead of the raw values of the parameters obtained directly from the vehicle bus. This removes the requirement for post-processing at the server. The separation of the script defining the vehicle-specific calculations from the main code allows for easy and fast updating of the parameter calculation definitions.

BRIEF DESCRIPTION OF THE DRAWINGS

A better understanding of the present invention can be obtained when the following detailed description is consid

FIG. 2 is a flowchart illustrating the operation of the main code and its interaction with the script according to an exemplary embodiment of the present invention.

DETAILED DESCRIPTION OF THE PREFERRED EMBODIMENT

A. Glossary

Figure 1:
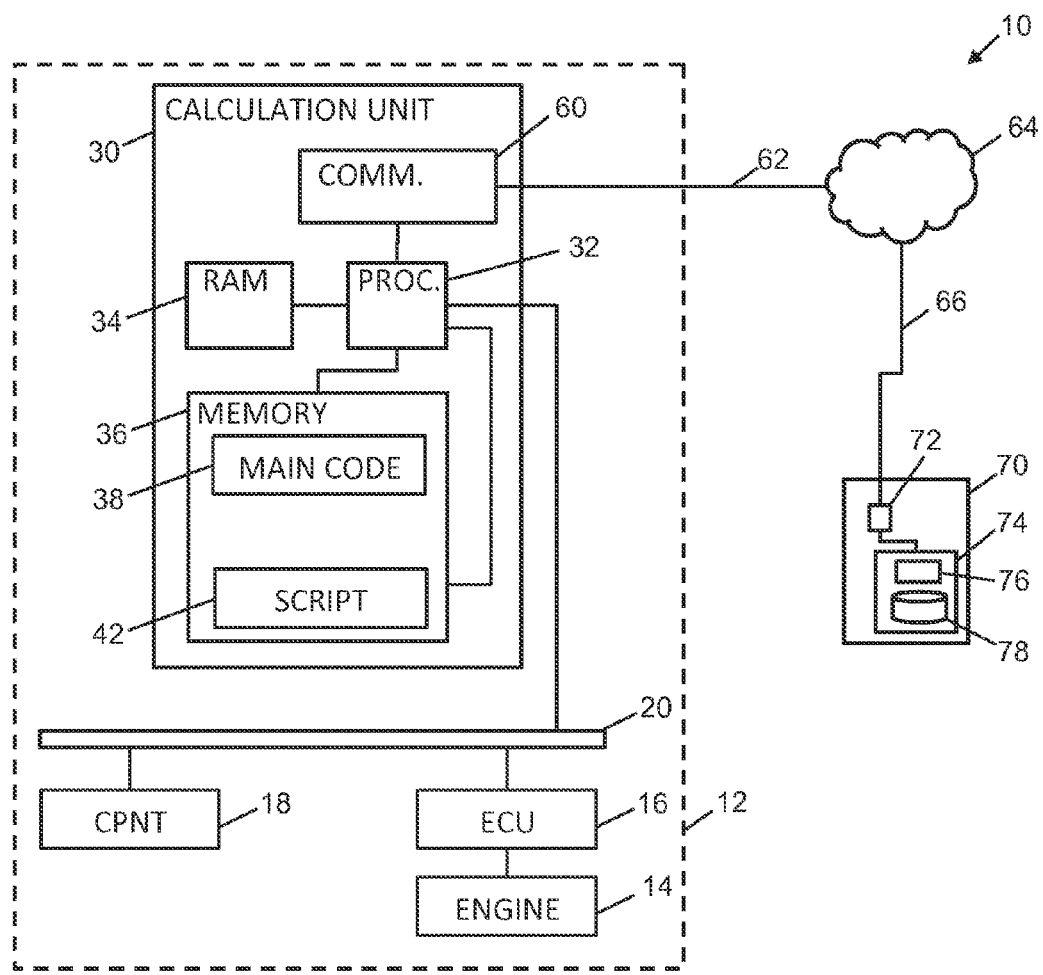
- FIG. 1 is a schematic diagram of a vehicle bus parameter calculation system according to an exemplary embodiment of the present invention.

Alternate Parameter Calculation—If a parameter is not available on the bus of a vehicle, a value for it may nevertheless be calculated based on other parameters that are available. It may also refer to a Parameter Override Calculation Asset—Typically a vehicle or automobile, such as a car, truck, bus, coach, motorbike, motorized tricycle, quad bike, snowmobile, emergency vehicle, delivery vehicle, service vehicle, taxi, train, boat or aeroplane, but can also include static or mobile excavators, back-hoes, construction machinery, other heavy machinery, cranes, farming equipment or any other self-powered equipment. An asset can be part of a fleet of assets, a group of assets, or a group of assets within a fleet. An asset may be referred to as a host.

Asset Agnostic—Device agnosticism is the capacity of a computing component to work with various different systems without requiring any special adaptations. Herein, we refer to the ability of a computing module (the main code) to work with various different assets without needing any special adaptation or configuration.

Bus or System Bus—For example, a bus in a controller area network, such as a CANbus. A bus connects all devices in the network together.

Engine—Typically an internal combustion engine, such as gasoline or diesel powered, but may also include dual fuel engines, hybrid engines, electrical motors, fuel cell engines, pressurized air engines, multiple engines within the same vehicle and other types of engine.

Module—Can refer to any component in this invention and its network and to any or all of the features of the invention without limitation.

Network—Can include, for example, both a mobile network and data network without limiting the terms meaning, and includes the use of wireless (2G, 3G, 4G, WiFi, WiMAX™, Wireless USB (Universal Serial Bus), Zigbee™, Bluetooth™ and satellite), and/or hard wired connections such as internet, Ethernet, ADSL (Asymmetrical Digital Subscriber Line), DSL (Digital Subscriber Line), cable modem, T1, T3, fibre, dial-up modem, etc.

Parameter Override Calculation—When a value of a parameter is retrieved from a bus it is modified using a calculation or algorithm, resulting in a different value of the parameter. This may be useful if it is considered that errors are present in the raw value of the parameter as received from the bus, or merely if a different methodology of determining the value of the parameter is required.

Parameter Calculation System—Used to describe the system of the present invention as a whole. In other words, it is an abbreviated form for an asset-agnostic framework with asset-specific module for alternate bus parameter calculation.

Processor—Refers to any electronic circuit or group of circuits that perform calculations, and may include, for example, single or multicore processors, an ASIC (Application Specific Integrated Circuit), and dedicated circuits implemented, for example, on a reconfigurable device such as an FPGA (Field Programmable Gate Array). The processor performs the steps in the flowchart, whether they are explicitly described as being executed by the processor or whether the execution thereby is implicit due to the steps being described as performed by code or a module.

Server—Refers to any computing device, or group of devices, that provide the functions described herein as being provided by one or more servers.

B. Exemplary Embodiment

Referring to FIG. 1, an exemplary parameter calculation system 10 is shown, according to an embodiment of the present invention. The parameter calculation system 10 monitors and overrides bus parameters in a vehicle 12, which is typically equipped with engine 14, engine control unit (ECU) 16, one or more vehicle components 18 and a vehicle bus 20, which connects to the ECU and vehicle components. Attached to the bus 20 is a parameter calculation unit 30, which includes a processor 32 operably connected to a random access memory (RAM) 34, a memory 36 storing computer readable instructions that form the main code 38 and computer readable instructions that form a script 42. Memory 36 may be, for example, be a hard disk drive or solid-state memory. Alternately, memory 36 may be divided into one or more individual memories. Also present in the calculation unit 30 is a communications module 60 that permits communication of data, requests and/or instructions to and from the calculation unit.

In operation, the processor 32 loads the main code 38 and the script 42 into the RAM 34, and then proceeds to process the computer readable instructions of the main code, referring, when required, to the script, both of which are now in the RAM. The main code 38 and the script 42 are responsible for the main functionality of the parameter calculation unit 30, this being to monitor the vehicle bus 20 for data, to override one or more parameters obtained from the vehicle bus, to calculate parameters not directly available from the bus and to update itself without needing to undergo a reboot or restart. A further function of the parameter calculation unit 30 is to transmit the resulting values of the parameters to a remote monitoring location. The script 42 is vehicle specific in that it defines the specific parameters that the main code 38 looks for, while the main code is asset agnostic and acts as a framework for parameter value collection that is common to different vehicles. The script 42 is typically a small file, and may be significantly smaller than the main code 38.

The parameter calculation unit 30 is connected from its communications module 60, via wireless connection 62, network 64, and wired and/or wireless connection 66 to a management server 70. The management server 70 is separate from and located remotely from the vehicle. The network 64 may be or include the internet, and may be or include a cellular or satellite telecommunications network. The management server 70 typically includes a processor 72 and one or more computer readable memories 74 connected thereto, the memories including computer readable instructions 76 and computer readable data 78. The management server 70 is used for sending the script 42 and/or updates of the script to the vehicle 12, and for receiving and storing parameter values from the vehicle, whether they be obtained directly from the vehicle bus 20 or result from alternate parameter calculations performed by the script.

Referring to FIG. 2, a flowchart shows the main steps in the operation of the parameter calculation system 10, in relation to the main code 38 and the script 42. At step 100, the process starts when the ignition of the vehicle is turned on, or when the vehicle is otherwise powered up. Next, in step 102, the main code 38 is loaded into the RAM 34 by the processor 32, and then, in step 104, the script 42 is also loaded into the RAM by the processor 32. After the main code 38 and the script 42 have been loaded into RAM, the main code in step 110 queries the script on the parameters it should replace/reproduce. These are the parameters that can be obtained directly from the bus 20 and that do not need to be subject to an alternate parameter or override calculation. In response, the script 42, which stores a list 112 of the parameters that need to be reproduced, provides them to the main code 38. Once the parameters have been received from the bus, which occurs in step 129, the main code 38 passes them down to the script 42 for further processing (see below). The system 10 is configured to read all or certain parameters either by means of listening for broadcasts, or by sending a request via the bus to the ECU to obtain a certain parameter at certain intervals or with a certain frequency, or using a combination of the two.

The script 42 can be customized to a specific vehicle or specific make and model of a vehicle, without the need to customize the main code 38. Also, the script 42 can be updated in both the memory 36 and the RAM 34 without needing to update or replace the main code 38, which means that the main code can continue to function without having to restart it or reboot the parameter calculation unit 30 after the script has been updated. During a script update, the main code 38 runs without interruption and does what it needs to do, but the processing of parameters that need to be reproduced will temporarily be paused for the script update, the duration of which is typically a fraction of a second.

In step 120, the main code requests the acceptable alternate parameters to be calculated. These parameters are either those that are not obtainable directly from the bus 20, or those that are obtainable directly from the bus but for which an alternate calculation is desired, i.e. a parameter override value. In this step, the main code 38 requests the script 42 to supply the alternate parameters to be reproduced. In response, the script 42, which stores a list 122 of the alternate parameters that need to be reproduced, provides them to the main code 38. Once the necessary data has been received from the bus, which occurs in step 129, the main code 38 passes it down to the script 42 for further processing (see below). As above, the script 42 can therefore be customized to a specific vehicle or specific make and model of a vehicle, without the need to customize the main code 38. The final value of the parameter that is obtained is therefore different to a raw value, if any, of the parameter that would be obtainable from the information from the bus without performing an algorithm.

Communication between the main code 38 and the script 42 can be implemented using any suitable protocol, and only a simple protocol is sufficient.

In some embodiments, there may be more than one alternate way of calculating an alternate parameter, such as fuel consumption. For example an engineer for a fleet management company may want to use a different calculation or algorithm than one created by an engineer that has designed the calculation override system 10. Some or all ways or algorithms for calculating the alternate parameter may be included in the script, and they may be ranked according to which should be used in priority. For example, in some situations, it may not be possible for the main script to calculate the value of the alternate parameter using a particular way, due to lack of underlying data from the bus.

In such a case, a lower-ranked way to calculate the alternate parameter will be used. Application of the various algorithms to the data on the bus may be attempted in order of their rankings until one of them yields a value for the parameter. As such, the parameter calculation unit 30 is effectively and automatically self-configuring. The rankings in the script 42 may be customizable by the fleet manager, via interaction with the management server 70.

After the main code 38 has been loaded into RAM 34, in step 102, the process splits into a second channel in which the vehicle bus 20 is monitored, in step 126. This step repeats itself continually, regularly or intermittently in order to capture activity that occurs on the bus 20. Data that is read from the bus is stored in a queue 128, from which it is read by the main code in step 129, in which the parameters are obtained from the bus. Such activity includes data produced by the ECU 16 and components 18, which serves directly as parameter values or as parameter values that are subject to parameter override calculations or alternate parameter calculations.

In step 130, the main code 38 requests the calculation of a value of an alternate parameter. The request may be generated by a timer in the override unit 30, and may be generated every 0.5 sec or every 5 sec, for example, and such time interval can be dynamically adjusted and/or set by a fleet manager through the management server 70.

In other cases, the request may be made as a result of a communication from the management server 70. The request, which includes values from the bus, is passed by the main code 38 to the script 42, where, in step 132, the alternate value of the parameter is calculated. The script 42 then returns the calculated parameter value to the main code 38.

In step 140, the calculated alternate value of the parameter is then reposted to the management server 70, either immediately or as and when a communications channel is opened between the communications module 60 and the management server. If the alternate value is not immediately transmitted, it may be stored in memory in the override unit 30 until it can be transmitted.

Steps 130 and 140 are repeated as and when a request is generated for the calculation of an alternate parameter value. As well as the parameter calculation unit 30 calculating the alternate parameters, it may also retrieve and transmit parameters that do not need to be subjected to an override calculation.

A possible benefit of the parameter calculation system 10 is that parameter values arriving at the management server 70 conform with each other in the way they are calculated. They may not have the same numerical value, but they will have been calculated based on common principles. Differences in the algorithms present in different types of vehicle compensate for differences in the way that the buses and/or components in the vehicles provide information to the bus. Values for a given parameter obtained from a group of different types of vehicle are therefore uniform and consistent, and do not need to be subjected to further amendment, calculation or correction. This is important because different calculations would need to be made at the management server 70 for different makes, models and/or year of the vehicles in a fleet, and this post-processing may consume excessive computing resources, especially for fleets with hundreds or thousands of vehicles, each with multiple parameters that need to be overridden.

Another possible benefit of the parameter calculation system is that the vehicle bus 20 may continue to be monitored during an update of the script 42, i.e. without requiring any downtime. Updates to the script 42 may be initiated automatically by the management server 70 or another, update server, they may be initiated by a fleet manager via the management server, or they may be initiated in response to a check for updates that is made by the main code 38. Updates may be made by FTP (File Transfer Protocol), for example, and once the update has been received by the parameter calculation unit 30, step 104 is invoked to load the new script into the RAM 34. Following this, steps 110 and 120 are repeated. By only updating the script 42 and not the combination of the script and the main code 38, then the updating process is more efficient and takes less time. Also, there are many more opportunities to update the script 42 than if the main code 38 had to be updated at the same time, which would entail interruption of monitoring of the vehicle bus 20.

Another possible benefit of the parameter calculation system is that fleet managers using it can customize it according to their particular needs.

C. Example of Alternate Parameter Calculation

Not all vehicles provide SPN250 data, which represents total fuel consumption for a vehicle. Instead, those vehicles report 0. In recent years, some manufacturers have stopped reporting SPN250 data. Alternate parameters that can be used are SPN183 (Engine Fuel Rate—amount of fuel consumed by engine per unit time) and SPN185 (Engine Average Fuel Economy—Average of instantaneous fuel economy for the segment of vehicle operation of interest). TABLE 1 gives an example of some of the data obtained from the bus of a test vehicle, which does report SPN250. The Data column gives the values of the total fuel consumption, either obtained directly from the bus as in SPN250, or calculated from the other bus parameters.

TABLE 1

| SPN (Suspect Parameter Number) | Data | Difference | % Difference |
|---|---|---|---|
| 250 | 397 | | |
| 183 | 391.871 | 5.129 | 1.29 |
| 185 | 394.705 | 2.295 | 0.58 |

Test systems were run for several months, both in trucks and in the lab. Either the SPN183 or the SPN185 bus parameter is suitable for the alternate calculation of the total fuel consumption, and each may be made more accurate by multiplying by a simple correction factor. More complex, alternate parameters may be calculated by the use of one or more algorithms.

D. Variations

The various parts of the parameter calculation system 10, such as the parameter calculation unit 30 and the management server 70, may also provide additional functionality not described herein. This additional functionality may be that known in the art or it may be further functionality. The parameter calculation system 10 may also be incorporated as part of a more general asset locator system, and/or a tachograph.

While total fuel consumption has been given as a parameter for which an alternate value is calculated, other parameters can be subject to alternate or override calculations, such as speed, acceleration, geographic location, idling time, trip time, trip distance, total fuel, trip fuel, fast braking, sharp braking, etc.

As well as being useful for fleets of vehicles, the parameter calculation system 30 may be used for a single vehicle.

It is foreseeable that the main code 38 may on occasion need to be updated, perhaps to add further functionality, to make it more resistant to cyber attacks or to remove bugs. In this case, the update of the main code 38 may require the parameter calculation unit 30 to be rebooted or restarted.

In general, unless otherwise indicated, singular elements may be in the plural and vice versa with no loss of generality.

Throughout the description, specific details have been set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

It will be clear to one having skill in the art that variations to the specific details disclosed herein can be made, resulting in other embodiments that are within the scope of the invention disclosed. Steps in the flowchart may be performed in a different order, other steps may be added, or one or more may be removed without altering the main function of the system. All values and configurations described herein are examples only and actual values of such depend on the specific embodiment. Accordingly, the scope of the invention is to be construed in accordance with the substance defined by the following claims.

The invention claimed is:

1. A device for obtaining values of parameters from information present on a network bus of an asset, the device comprising:
   a processor operably connected to a network bus of the asset, wherein the asset is a vehicle in a group of vehicles of different make and year;
   a computer readable memory operably connected to the processor;
   a main code stored in said computer readable memory, the main code being asset agnostic with respect to all vehicles within the group; and
   a script stored in said computer readable memory, the script being asset specific and including:

multiple algorithms for calculating a specific parameter; and
a ranking for each algorithm according to a priority in which it is to be used for calculating the specific parameter;
wherein the processor:
upon execution of the main code, requests a parameter to be obtained from the network bus; and
upon execution of the script:
receives the specific parameter to be obtained from the network bus; and
obtains a value of the specific parameter from information present on the network bus by performing the multiple algorithms on said information in order of the ranking for each algorithm until the value has been obtained.

2. The device of claim 1, wherein the value of the specific parameter is different to a raw value of the specific parameter that is obtainable from the information without performing the multiple algorithms.

3. The device of claim 1, wherein the processor, upon execution of the main code, transmits the value of the specific parameter to a remote server.

4. The device of claim 1, wherein the processor receives and loads into said computer readable memory an updated script while the main code is being executed.

5. The device of claim 4, wherein after said loading the processor continues to execute the main code and the updated script without requiring the device to be restarted or rebooted.

6. The device of claim 1, wherein:
said computer readable memory is random access memory (RAM);
the main code and script are each stored in one or more further computer-readable memories; and
the main code and the script are loaded into the RAM upon powering up the asset.

7. The device of claim 1, wherein the specific parameter is fuel consumption.

8. A method for obtaining values of parameters from information present on a network bus of an asset, the method comprising:
connecting a processor to a network bus of the asset, wherein the asset is a vehicle in a group of vehicles of different make and year, and wherein a computer readable memory is operably connected to the processor;
storing a main code in said computer readable memory, the main code being asset agnostic with respect to all vehicles within the group;
storing a script in said computer readable memory, the script being asset specific and including multiple ranked algorithms for calculating a specific parameter;
executing, by a processor, the main code and thereby requesting a parameter to be obtained from the network bus; and
executing, by the processor, the script and thereby:
receiving the specific parameter to be obtained from the network bus; and
obtaining a value of the specific parameter from information present on the network bus by performing the multiple ranked algorithms on said information in order of ranking until the value has been obtained.

9. The method of claim 8, wherein the value of the specific parameter is different to a raw value of the specific parameter that is obtainable from the information without performing the multiple ranked algorithms.

10. The method of claim 8, further comprising:
the processor receiving and loading into the computer readable memory an updated script; and
the processor then continuing to execute the main code and the updated script without having been restarted.

11. A system for obtaining values of parameters from information present on a network bus of an asset, the system comprising:
a server;
a processor operably connected to a network bus of the asset, wherein the asset is a vehicle in a group of vehicles of different make and year;
a computer readable memory operably connected to the processor;
a main code stored in said computer readable memory, the main code being asset agnostic with respect to all vehicles within the group; and
a script stored in said computer readable memory, the script being asset specific and including multiple ranked algorithms for calculating a specific parameter;
wherein the processor:
upon execution of the main code, requests a parameter to be obtained from the network bus;
upon execution of the script:
receives
the specific parameter to be obtained from the network bus; and
obtains a value of the specific parameter from information present on the network bus by performing the multiple ranked algorithms on said information in order of ranking until the value has been obtained; and
upon execution of the main code, transmits the value of the specific parameter to the server over the air.

12. The system of claim 11, wherein
the value of the specific parameter conforms, in a way in which it is calculated, with other values of like parameters received by the server from all said vehicles, such that post-processing by the server to conform it to said other values is unnecessary.

* * * * *